(12) United States Patent
Holmes, II et al.

(10) Patent No.: US 11,805,132 B2
(45) Date of Patent: Oct. 31, 2023

(54) LOCATION SPECIFIC TEMPORARY AUTHENTICATION SYSTEM

(71) Applicant: Mojipass, LLC, Charlotte, NC (US)

(72) Inventors: Joseph Holmes, II, Charlotte, NC (US); Dale Johnson, Atlanta, GA (US)

(73) Assignee: MOJIPASS, LLC

( * ) Notice: Subject to any disclaimer, the term of this patent is extended or adjusted under 35 U.S.C. 154(b) by 232 days.

(21) Appl. No.: 16/934,477

(22) Filed: Jul. 21, 2020

(65) Prior Publication Data

US 2021/0029133 A1 Jan. 28, 2021

Related U.S. Application Data

(60) Provisional application No. 62/922,073, filed on Jul. 22, 2019.

(51) Int. Cl.

| | | |
|---|---|---|
| *H04L 9/40* | (2022.01) | |
| *G06K 19/06* | (2006.01) | |
| *G06Q 20/12* | (2012.01) | |
| *G06Q 20/32* | (2012.01) | |
| *G06K 7/14* | (2006.01) | |
| *G06Q 30/018* | (2023.01) | |

(52) U.S. Cl.
CPC .......... *H04L 63/107* (2013.01); *G06K 7/1417* (2013.01); *G06K 19/06037* (2013.01); *G06Q 20/127* (2013.01); *G06Q 20/1235* (2013.01); *G06Q 20/3276* (2013.01); *G06Q 30/0185* (2013.01); *H04L 63/083* (2013.01); *H04L 63/0876* (2013.01); *H04L 63/102* (2013.01)

(58) Field of Classification Search
None
See application file for complete search history.

(56) References Cited

U.S. PATENT DOCUMENTS

| | | | |
|---|---|---|---|
| 9,262,771 B1* | 2/2016 | Patel | G06Q 30/0237 |
| 2004/0123151 A1* | 6/2004 | Mizrah | H04L 63/102 |
| | | | 726/5 |
| 2008/0248815 A1* | 10/2008 | Busch | H04L 67/52 |
| | | | 455/456.5 |
| 2010/0063889 A1* | 3/2010 | Proctor, Jr. | G06Q 50/01 |
| | | | 705/26.1 |
| 2011/0060652 A1* | 3/2011 | Morton | H04W 4/021 |
| | | | 705/14.58 |
| 2011/0119743 A1* | 5/2011 | Gleim | H04L 63/0807 |
| | | | 726/26 |
| 2014/0012654 A1* | 1/2014 | Stewart | G06Q 30/0214 |
| | | | 705/14.34 |
| 2014/0074490 A1* | 3/2014 | Kundu | G06Q 30/016 |
| | | | 705/1.1 |

(Continued)

*Primary Examiner* — Kaveh Abrishamkar
(74) *Attorney, Agent, or Firm* — G. Spencer Lueders, Jr.

(57) ABSTRACT

Methods and systems for providing temporary and secure authenticated access to content from a content provider, such as data, software, services, streaming content, entertainment, and/or other information. In one embodiment, the present invention contemplates using location specific automatic authentication. The present invention contemplates a system, computer program, and associated processes and methods to provide temporary and private authentication including secure temporary authorization to data, content, software, services, and/or information based on a verification of a user's proximity to a venue.

30 Claims, 11 Drawing Sheets

(56) References Cited

U.S. PATENT DOCUMENTS

| | | | |
|---|---|---|---|
| 2014/0279204 A1* | 9/2014 | Roketenetz | G06Q 30/0631 |
| | | | 705/26.7 |
| 2014/0310779 A1* | 10/2014 | Lof | G06F 21/6254 |
| | | | 726/4 |
| 2015/0264573 A1* | 9/2015 | Giordano | H04L 67/1097 |
| | | | 726/7 |
| 2016/0359816 A1* | 12/2016 | Vedula | H04L 67/306 |
| 2017/0161716 A1* | 6/2017 | Hurley | G06Q 20/3224 |
| 2020/0082402 A1* | 3/2020 | Patel | G06Q 20/18 |
| 2020/0242542 A1* | 7/2020 | Silva | G06Q 20/18 |
| 2021/0234705 A1* | 7/2021 | Wesby | H04L 9/321 |

* cited by examiner

LOCATION SPECIFIC TEMPORARY AUTHENTICATION SYSTEM

CROSS-REFERENCE TO RELATED PATENT APPLICATIONS

This application claims priority to Provisional U.S. Application No. 62/922,073, filed Jul. 22, 2019, and which is incorporated herein by reference in its entirety.

BACKGROUND OF THE INVENTION

Content providers, such as streaming entertainment services, software services, movie distributors, and the like are oftentimes motivated to grow their subscribers and customers, particularly when the providers offer a paid or subscription service to access the content. Many marketing and advertising platforms allow for the content providers to reach new customers, and acquisition costs per customer can be a very large portion of a content provider's expenses. Current platforms require a potential customer to provide personal information in order to receive a trial of the content, even if the trial period is "free." The personal information includes name, email, credit card number, address, and telephone number. This is overly burdensome for the potential customer, and as described below many potential customers do not wish to provide this personal information for a number of reasons, and thus never complete the customer acquisition. In some cases, there may still be an acquisition cost or fee to the content provider simply because the potential customer clicked on the advertisement, and then dropped out of the purchase or sign up process. It is estimated that up to 30% of all potential customers drop out of the sign up process, which results in substantial lost opportunity for the content providers. Accordingly, there is a need to provide a more effective system and method for obtaining new customers and reaching new audiences.

At the same time, customer and the buying public are increasingly aware and cautious about privacy, particularly if their personal data is shared, when payment is required using a credit or debit card, and/or if their purchase of a product or service, even a trial, results in unwanted consequences, such as being added to a mailing list or the like. As such, potential customers are less likely to share this information with service providers up front, making their conversion from potential customer to actual customer less likely, particularly if the customer has not tried or sampled the product or service. In addition to the substantial lost opportunity and lost acquisition costs to the content providers, current platforms also deprive potential customers from otherwise enjoying content that may provide entertainment, knowledge, and service to their lives. Accordingly, there is a need to allow a more seamless, private, and less burdensome process for potential customers to enjoy content from new content providers.

Governments have responded to public concerns by adopting regulatory measures to protect customers, including the General Data Protection Regulation (GDPR) and other measures. Such measures help ensure that citizens have more control over their personal data and that parties collecting this data comply with certain privacy controls. Thus, there is a need for parties collecting data, particularly in conjunction with providing content, to do so in a manner that ensures privacy and compliance with any regulatory measures.

BRIEF SUMMARY OF THE INVENTION

The present invention provides temporary and secure authenticated access to content from a content provider, such as data, software, services, streaming content, entertainment, and/or other information. In one embodiment, the present invention contemplates using location specific automatic authentication as described herein. The present invention contemplates a system, computer program, and associated processes and methods to provide the aforementioned authentication, and in one embodiment provides secure temporary authorization to data, content, software, services, and/or information based on a verification of a user's proximity to a venue. In one embodiment, the user, or more specifically the user device, is only known the venue and/or the service provider by a hashed or encrypted identification generated by the system of the present invention.

A method for providing content on a user device according to one embodiment of the present invention comprises receiving a user device identification and a request to receive content of a content provider from a user device, such as a mobile phone or device. The request is received by at least one server having one or more processors and is received via a computer network, such as the internet or World Wide Web. The method includes creating an intermediary user account or credentials relating to the user device identification. In this way, the user device identification is hidden or converted (e.g., hashed) so that is not known to content providers, and thus retains privacy of the user. The method further comprises sending the intermediary credentials to a content provider for authorization to receive content from the content provider that are specific to the intermediary credentials. The method further comprises receiving authorization of the intermediary credentials from the content provider allowing access to the content of the content provider. The method further comprises providing temporary access to the content of the content provider to the user device, such as via a website, allowing the user to enjoy the content.

A system for accessing content on a user device according to another embodiment of the present invention comprises a server having one or more processors coupled to memory, wherein the server is configured to receive a user device identification and request to receive content of a content provider from a user device. The server is also configured to create intermediary credentials relating to the user device identification and the content provider, to receive authorization of the intermediary credentials, and provide temporary access to the content of the content provider.

DETAILED DESCRIPTION OF THE INVENTION

Before turning to the figures that illustrate several embodiments of the present invention in detail, it should be understood that the present invention is not limited to the details or methods set forth in this specification or illustrated in the figures. It should also be understood that the terminology is for the purpose of description only and not limiting to the full scope of the present invention.

The following summary is an example of one or more embodiments of the present invention in order to provide a basic understanding of some aspects of the invention. This summary is not an extensive overview of the invention. This summary is not intended to be limiting in any way of the complete scope of the present invention. This summary in conjunction with the drawings merely presents some features and benefits of the present invention.

Figure 1:
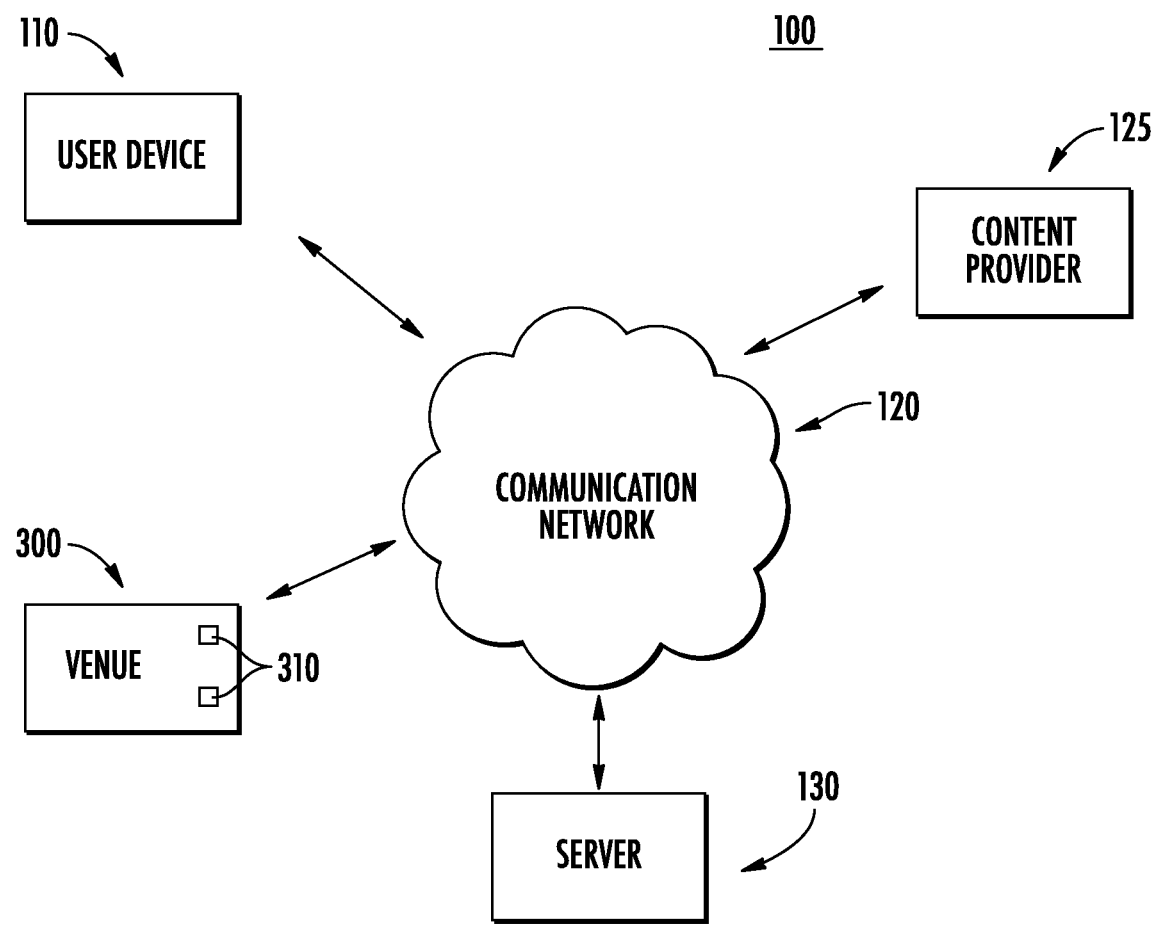
FIG. 1 is a diagram illustrating an exemplary system according to one embodiment of the present invention.

FIG. 1 shows a system 100 for providing temporary authorization of a user device 110 to receive content, such as services, software, data, and/or information from a content provider. A user (not shown), such as a person, is assumed in possession of and/or in control of the user device 110 and can provide input and actions to the user device 110 according to the present invention. The system 100 includes a communications network 120, for example an internet protocol (IP) network, the internet, a wireless network (WiFi), a local area network (LAN), and the like. The system 100 also includes a server 130, which may receive information and requests from one or more user devices 110, as well as transmitting information, content, and data to the user devices 110 and a content provider 125. The user device 110 may be a mobile device, such as a smartphone or tablet, or may be another device, such as a personal computer or other device capable of connecting to the internet and/or to the server 130 via the communications network 120. FIG. 1 also shows a venue 300 that is part of at least one embodiment of the present invention.

Although FIG. 1 shows a single communications network 120, the system 100 may comprise more than one communication networks that can be connected by one or more ways. Similarly, FIG. 1 shows only a single server 130 and user device 110, the systems 100 can include a plurality of user devices and servers.

Figure 2:
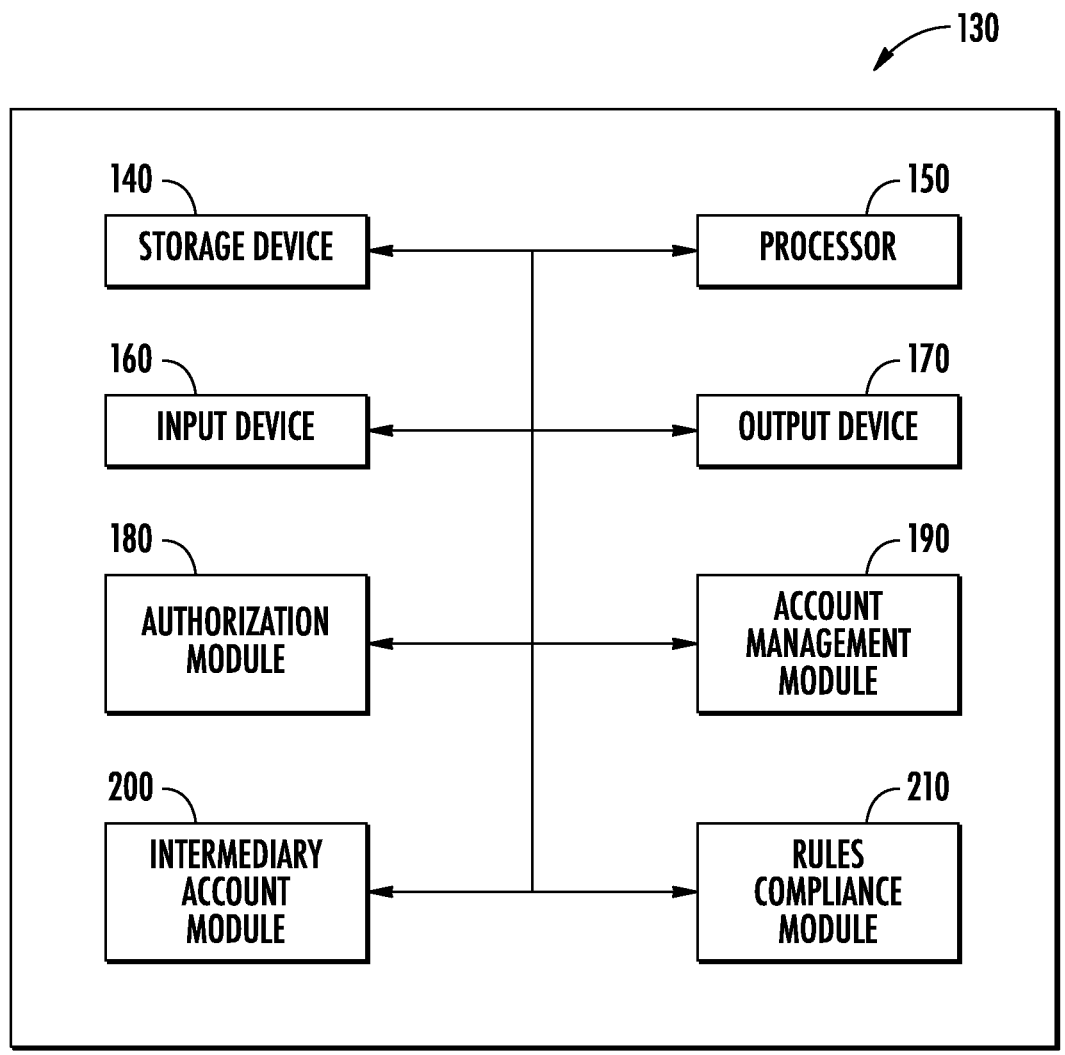
FIG. 2 is a diagram illustrating an exemplary server according to one embodiment of the present invention.

FIG. 2 shows one embodiment of the server 130 according to the present invention. While only one embodiment of the server 130 is shown, one or more servers not shown can include the components and functionality described herein with respect to the server 130. The server 130 includes a storage device 140, processor 150, input device 160, output device 170, authorization module 180, account management module 190, intermediary account module 200, and rules compliance module 210. The modules and/or components of the server 130 may be hardware and/or software. The modules and/or components according to one embodiment of the present invention utilize the processor 150 to execute computer executable instructions. The server 130 may include other modules and/or components that are known in the art. The modules and components of the server 130 may be located within the server 130 and/or connected or operably connected to the server 130.

The input device 160 receives information associated with the server 130, such as instructions from the user via the user device 110 or instructions from a computing device. The input device 160 may include a keyboard, scanner, or other device. The output device 170 outputs information and/or data associated with the server 130. The authorization module 180 is configured to check whether a user device identification (e.g., a smartphone serial number, a media access control (MAC) number, or similar identifier of the user device 110) is authorized to receive content from a content provider. If a user device identification is not authorized, the authorization module 180 can communicate with other modules and other servers to obtain authorization for the user device identification if certain conditions are met, as discussed herein. The account management module 190 manages user device accounts associated with various user devices.

The intermediary account module 200 is configured to receive user device identifications as well as authorized requests to receive content from a content provider. The intermediary account module 200 is also configured to check whether an authorized user device identification has an account with a content provider. If the authorized user device identification does not have an account, the intermediary account module 200 is configured to create an intermediary account with the content provider that is associated with the authorized user device identification. The rules compliance module 210 is configured to manage local rules, laws, and/or regulations (e.g., privacy laws) for various locations, as well as any business rules that may be put in place for accessing content pursuant to the present invention. The rule compliance module 210 is configured to check for rules compliance and communicate with other modules about the compliance status of any particular user device and associated accounts.

Figure 3:
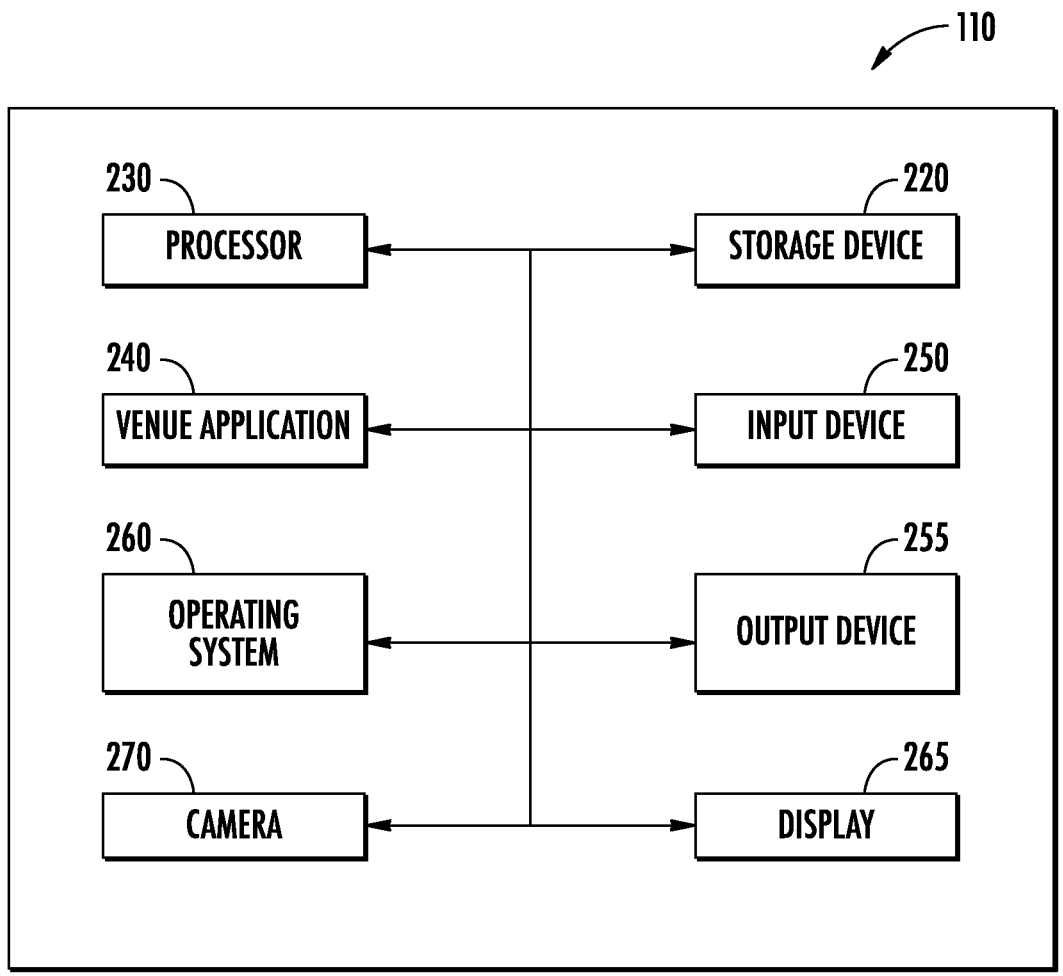
FIG. 3 is a diagram illustrating an exemplary user device according to one embodiment of the present invention.

FIG. 3 shows an exemplary user device 110, which may be a mobile device, such as a smartphone or tablet, or may be another device, such as a computer or other device capable of connecting to the Internet. Such devices are known, and typically include memory or storage, the ability to operate mobile applications, internet and Bluetooth Low Energy (BLE) connectivity, such as a BLE radio, and include a user interface or screen whereby the user can select item(s) on the screen by touch, mouse click, or the like. The present invention also contemplates utilizing other technologies present in a user device, such as IR, optical, computer vision, geolocation, and other technologies, either alone or in combination. In fact, the present invention contemplates operability across the electromagnetic spectrum, acoustic spectrum, and geolocation, either alone or in combination. According to one embodiment, the user device 110 includes a storage device 220, processor 230, venue application 240, input device 250, output device 255, operating system 260, and display 265. The modules and components can be hardware or software and can utilize the processor 230 to execute computer executable instructions and/or include a processor to execute computer executable instructions. The processor 230 executes the operating system 260 and/or any other computer executable instructions for the user device 110, including without limitations the venue application 240. The user device 110 may also include random access memory, which can temporarily store the operating system, the instructions, and/or any other data associate with the user device 110. The random access memory may include one or more levels of memory storage, including without limitation processor register, storage disk cache, and main memory.

The user device 110 can include one or more other modules, components and/or processors known in the art, which may be located within the user device 110 or operably connected to the user device 110. The venue application 240 operates a venue application on the user device 110. The venue application 240 may be a mobile or native application associated with a venue. Alternatively, the venue application 240 may not be associated with a venue. Such applications are common to such devices and typically can be downloaded by a user to the user's device, such as through the Apply App Store, Google, or other provider. Programming code may be included in the venue application 240 to display information for the user and receive input from the user via a display 265 (see FIG. 6), an input device 250, and an output device 255 on the user device 110. The user device 110 may also include a camera 270 for capturing images, scanning (e.g., QR codes), and the like. The camera 270 may also be considered an input device as described herein. The venue application 240 communicates with the server 130. The operating system 260 operates an operating system on the user device 110 and uses the processor 230 to receive information from the input device 250 and send information from the output device 255. In one embodiment, the components of the user device 110 are configured to receive BLE signals and send this information and other information to the server 130 via the communication network 120.

The storage device 220 stores user account information (e.g., social media), user preferences and settings, any applications, and/or any other data, information, or program code associated with the user device 110. The storage device 220 may comprise a plurality of storage devices, and may include long-term storage (e.g., hard drives, flash memory, etc.), short-term storage (e.g., random access memory, graphic memory, etc.), and/or any other type of computer readable storage.

Figure 4:
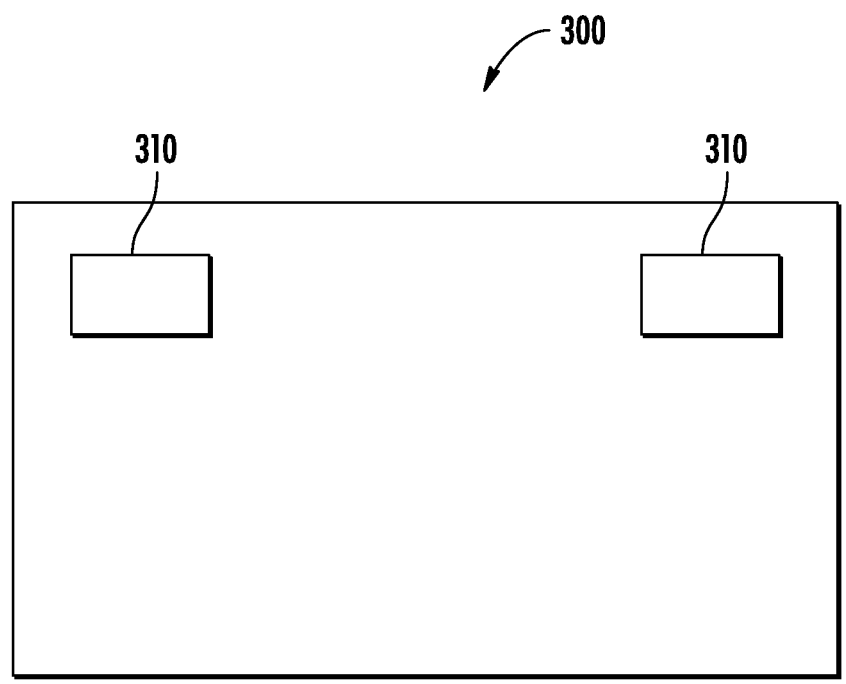
FIG. 4 is a diagram illustrating an exemplary venue according to one embodiment of the present invention.

FIGS. 1 & 4 shows a venue 300 according to one embodiment of the present invention. The venue 300 has at least one venue identification source 310. According to one embodiment, the venue identification source 310 is a BLE beacon that identifies a particular venue. BLE beacons may be battery powered and broadcast a BLE signal that may be detected by BLE-enabled devices within a certain range of distance, such as up to 100 feet or more. Other types of venue identification sources 310 may also be used that operate within the electromagnetic spectrum, acoustic spectrum, and/or geolocation and are contemplated by the present invention. In one embodiment, the venue 300 may be a commercial establishment, such as a coffee shop, restaurant, retailer, or any other location. In addition, the venue 300 may be one of a plurality of venues under a common brand and/or ownership (e.g., Starbucks® coffee shops, or Disney® theme parks).

In yet another embodiment, the venue 300 is capable of moving. Accordingly, the venue 300 of the present invention may be considered fixed or moving, or capable of moving. The venue 300 according to one embodiment of the present invention may also be a device, such as a smartphone or other device that can be detected by the user device 110, that allows the system of the present invention to temporarily authorize a user to access content of a content provider 125 if certain conditions are met, such as being in detectable proximity to the venue 300 and at least one venue identification source 310. In yet another embodiment, the venue 300 may be a moving vehicle or other moving object.

Figure 5:
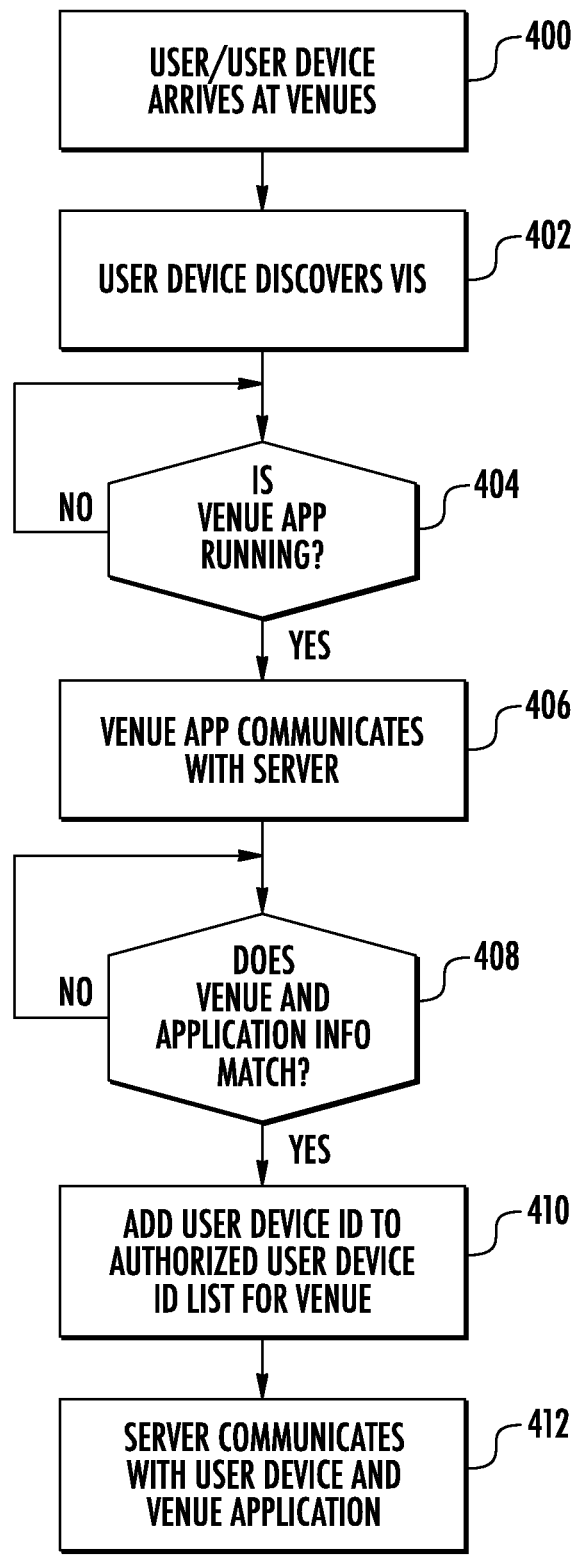
FIG. 5 is a flowchart illustrating an exemplary authorization process according to one embodiment of the present invention.
Figure 6:
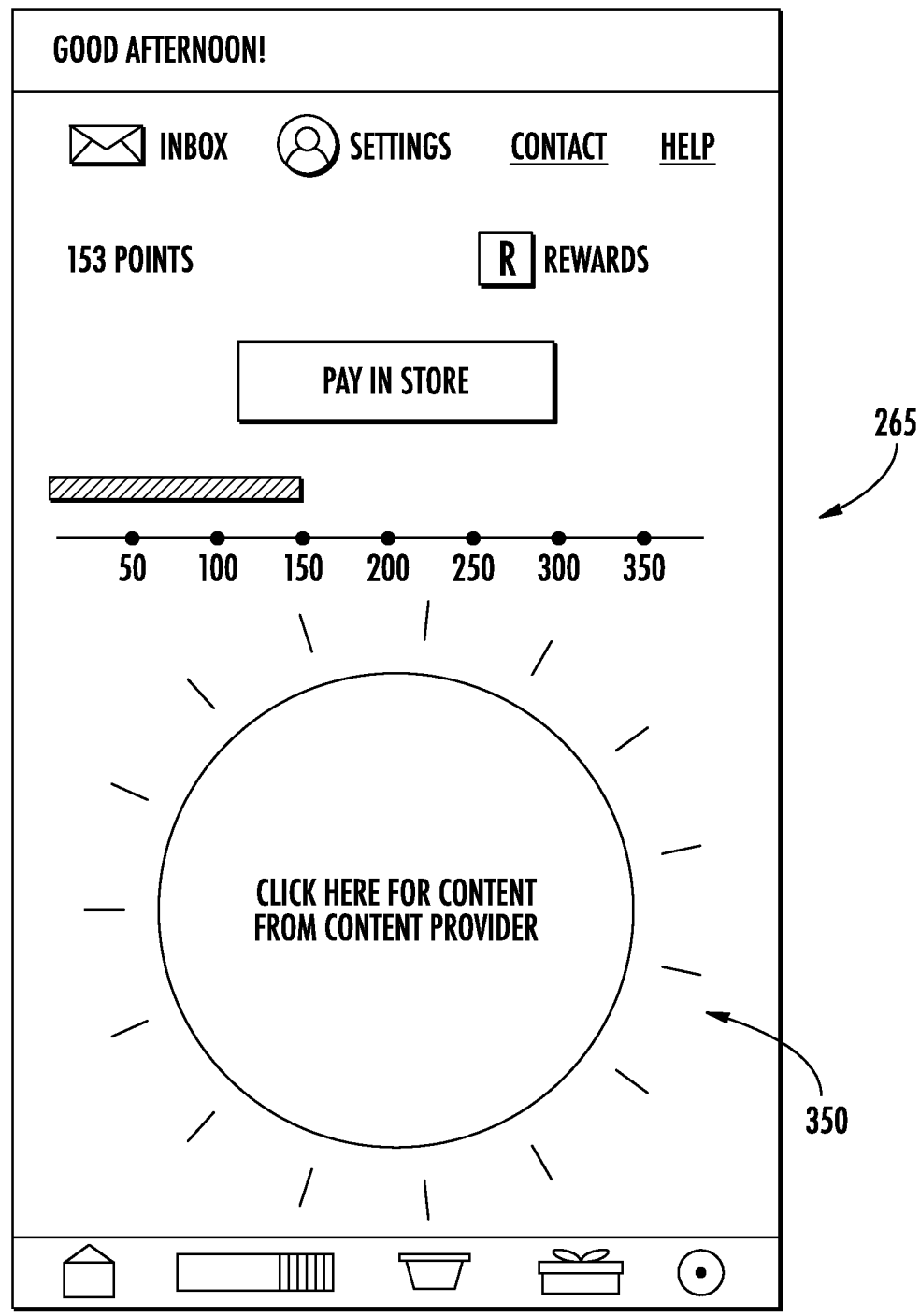
FIG. 6 is an exemplary user interface according to one embodiment of the present invention.

Turning now to FIG. 5-6, a method of one embodiment of the present invention is shown in flowcharts relating to providing content on a user device. In particular, the method includes step 400 whereby the user/user device 110 arrives at the venue 300. The term "arrive" can mean in proximity to the venue such that the venue and user device can be read, detected, discovered, or otherwise communicative therebetween. The user device 110 is able to detect at least one venue identification source 310 located inside, proximate, or otherwise positioned to indicate the location of the venue (step 402). Smartphones and other electronic devices are commonly programmed to discover and record venue identification sources 310 and other devices that broadcast signals within range of the device, such as other smartphones, BLE beacons, and the like. In particular, a BLE-enabled user device according to one embodiment of the present invention may scan for other signals using time intervals of every 20 milliseconds to 10.24 seconds. BLE and other signals that are detected, whether they can be connected to or not, may be shown on the display 265 of the user device 110.

The system 100 contemplates a mobile application of the type that are typically downloaded on mobile devices from, for example, the Apple® App Store or the like. While the present invention contemplates a mobile application, which may or may not be associated or representative of a venue, in one exemplary embodiment, the mobile application (having a mobile application identifier discussed below as a venue application identifier), is a mobile application associated with the venue, and herein referenced for convenience as a venue application 240, for example a venue application like the Starbucks® or Uber® mobile applications. When the venue application 240 is opened on the user device 110 (step 404), programming language (e.g., SDK) inside the venue application 240 is configured to send certain information to the server 130 on a certain time interval (step 406), such as every 10 seconds or every 1 minute or more. In one embodiment, the venue application 240 does not communicate with the server 130 unless the venue application is installed and open on the user device 110. The venue application 240 also sends a user device identification 330, such as the user device serial number, and a venue application identifier 340, which relates to the venue 300. In one embodiment, the user device identification 330 is hashed or otherwise encrypted before it is sent to the server 130 or when received by the server. In one embodiment, the user, or more specifically the user device 110, is only identified to the venue 300 and/or the content provider 125, if identified at all, by a hashed or encrypted identification generated by the system of the present invention, allowing for privacy and efficient access to the content provider content.

The server 130 compares the venue application identifier 340 and venue identification source 310 with a database of approved venue applications and related venue identification sources (step 408) to confirm the user device 110 is at the venue 300. As stated above, this confirmation by the server 130 of this information continues on a set interval of time, and the methods according to one embodiment of the present invention operate only when the user device 110 is at the venue 300 as defined herein. As such, should the user device 110 move away from the venue 300 so that the user device 110 no longer detects the venue identification source 310, the information sent from the venue application 240 will not include the venue identification source 310, and when the server 130 performs step 408, the comparison of received information about venue application identifier 340 and venue identification source 310 will not match the approved venue applications and related venue identification sources, and the system 100 will not initialize, not continue, or stop operating until the desired match is obtained. In one embodiment, if the system 100 of the present invention fails to detect the user device 110 using the aforementioned detection and verification method, the system removes any decryption key and content provider authorization data from the memory or storage device 140 of the user device 110, and the user device will no longer receive content provider content. In one embodiment, the display 265 of the user device 110 may show an exit call to action, which may also include information on how to sign up as a customer of the content provider. In one embodiment, further incentives, such as promotional discounts, coupons, and other sales related incentives can be added to the exit call to action shown on the display of the user device.

When the user device 110 sent information of venue application identifier 340 and venue identification source 310 match the database of approved venue applications and related venue identification sources, the user device identification 330 is added to a database of authorized user device identifications (step 410) for receiving content from a content provider 125 as discussed herein. In one embodiment, information about the user device identification 330 may also be manipulated and tracked, such as determining if the user device identification has been authorized in the past and/or if any restrictions are present for the user device identification.

The authorization is sent back to the user device 110 and stored in the storage device 140 by way of the communication network 120 (step 412) along with other instructions and programming (e.g., SDK) to the venue application 240 to indicate to the user that the user device 110 is authorized to receive the content. As shown in FIG. 6, this may be a visual prompt 350 integrated into the user interface of the user device venue application 240 on the user device display 265. The prompt may also be audio, video, vibration, or other method of communication. In addition, certain information about or relating to the content provider 125 and/or content thereof may be delivered to the user interface or display 265 of the user device 110, such as a list of shows, featured movies, trailers, software, and/or a portion or the entire library of the content provider's content and/or services that can be selected by the user.

According to one embodiment, the user interface prompt 350 or other elements may be placed into the design of the mobile application as determined by the venue or other entity, such as to meet brand standards, advertising requirements, or any other desired display determination. Such display elements may include without limitation, a round icon, card, list item, title bar, and bottom bar round badge that may be associated with a content provider. In one embodiment, these elements may be standardized such that should the venue switch content providers, the element shapes may remain, but with the new content provider information contained therein. As such, the venue may easily switch between content providers without making any significant changes to the mobile application.

Figure 7:
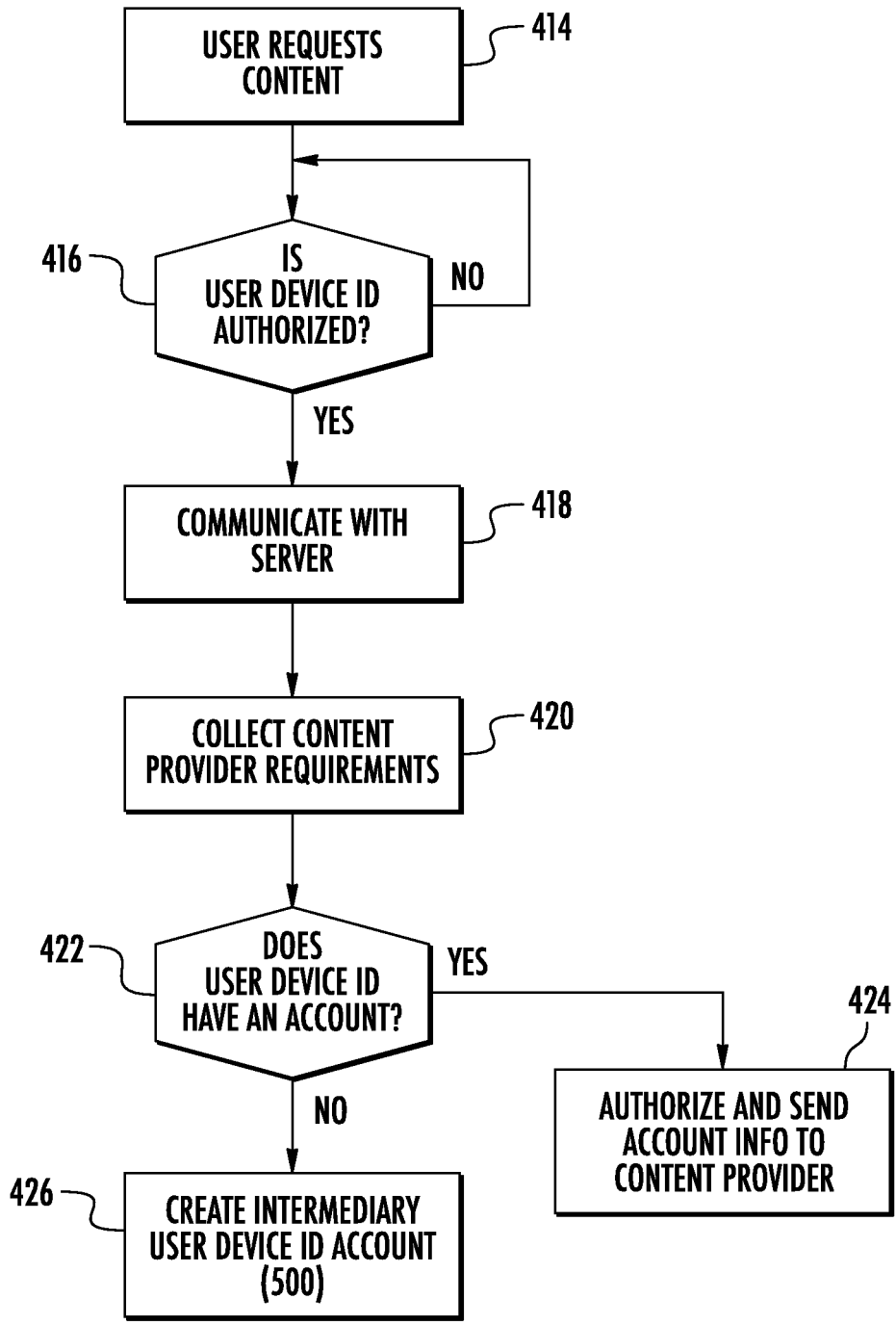
FIGS. 7-8 are flowcharts illustrating an exemplary authorized account creation process according to one embodiment of the present invention.

FIG. 7 illustrates when a user clicks, selects, or otherwise engages the prompt 350 to receive content from the content provider 125 (step 414). This action causes the user device 110 and venue application 240 to communicate this request to the server 130. The server 130 first confirms that the user device identification 330 is authorized (step 416) by comparing the user device identification with the database of authorized user device identifications (see step 410). Once confirmed, the request proceeds to the server 130 (step 418). The server 130 then collects a content provider's account setup and authentication procedures for that particular content provider 125 and venue (step 420). The content provider 125 may be one of many content providers, for example Netflix®, Hula®, Vudu®, Disney+®, HBO® Max, Quibi®, Peacock®, and the like. The content provider 125 may also be software, such as Microsoft® Office® or other software as a service, particularly if the content is subscription based. In one embodiment, the account setup and authentication procedure for a content provider 125 is an email address and password. Any other type of account setup and authentication procedure could be used in the alternative.

Once the content provider's account setup and authentication procedures are known, the server 130 determines if the user device identification 330 has an existing account with the content provider 125 (step 422). This determination could occur, for example, by comparing a user device identification to a database of user device identifications and associated accounts for a match. If the user device identification 330 already has an account with the content provider 125, the server 130 authorizes the content provider 125 to provide content (step 424) while certain business rules and conditions are met, such as the user device being at the venue as described above.

In the ease where the user device identification 330 does not have an account with the content provider 125, the system 100 may create an intermediary user account 500 (step 426) or other authorization credentials for the user device in order to access the content of the content provider 125. The term "create" may also include selecting user account information from a predetermined or provided list and applying the information to a particular intermediate user account. The intermediary user account 500 may be specific to the content provider 125, and may include information such as resource server address, request token, refresh token, resource decryption key, and others that are known in the art. The intermediary user account 500 may also be in the form of an email address and password that is associated with the user device identification 330, and that may be created by the system 110 and stored in the server 130 or component thereof and sent to the content provider 125 for authorization. Information about the intermediary user account 500 can also be stored by the server 130 and monitored for future content provider content requests and other information about account usage. Other steps may be taken in or around the time of this account setup and authorization, such as if there are restrictions with the intermediary user account 500, if payment is required for authorization, and/or other steps that impact how the user ultimately accesses the content provider's content. Further steps may be taken, including without limitation alerting the user (via the user device 110) that they may have issues or items to resolve before further access is permitted.

Figure 8:
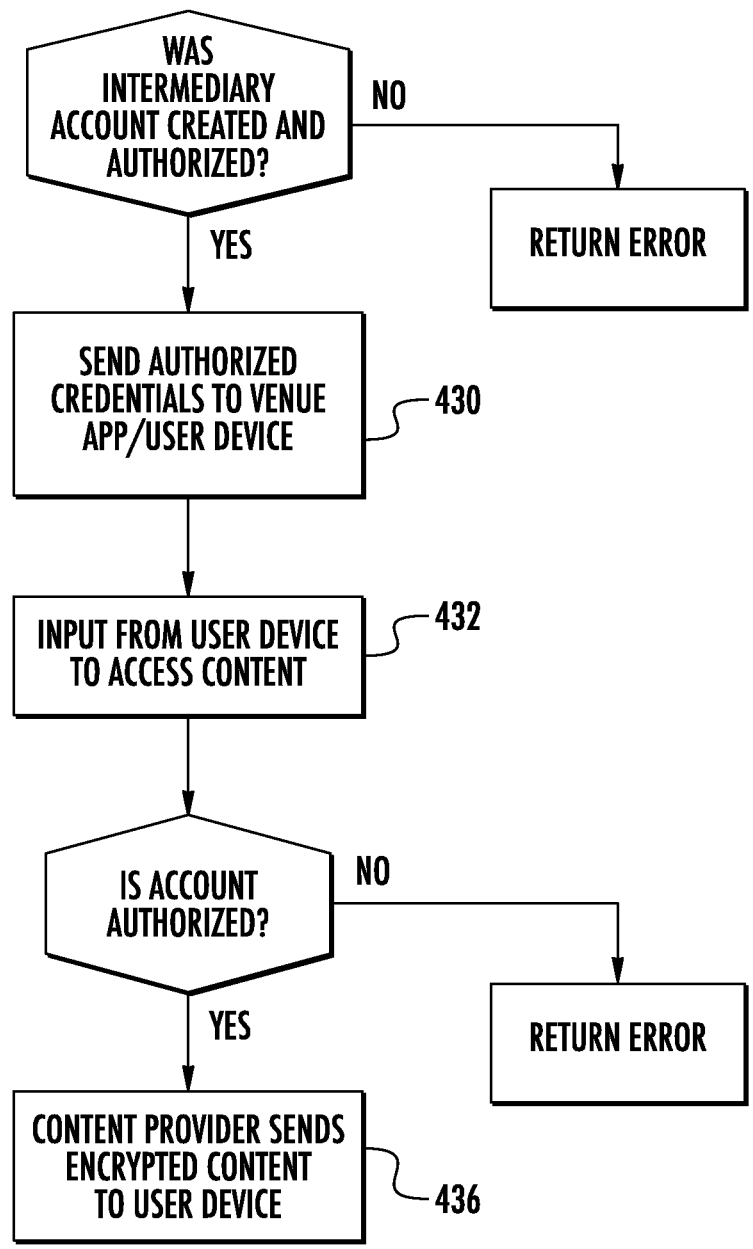

FIG. 8 continues the method according to one embodiment of the present invention wherein the system 100 determines if the intermediary user account 500 was created correctly and authorized by the content provider (step 428), such as by comparing the account information to the content provider's rules and requirements, and/or performing an authorization step with the content provider 125. If the intermediary user account 500 is created correctly and authorized, the server 130 sends the authorized intermediary user account 500 information to the user device 110 via the venue application 240 where it may be stored in the user device storage device 220 (step 430). The content of the content provider 125 may then be presented on the display 265 of the user device 110. The content may come from a content server of the content provider 125, which, has its own credential, resource and digital rights management systems. Examples of digital rights management systems may include without limitation DASH, CENC PlayReady, and Widevine. The system 100 of the present invention supports encrypted or unencrypted content delivered from the content provider 125 to the user device 110.

More specifically, when a user selects a particular piece of content of the content provider 125 presented on the user device 110 (step 432), the content provider determines if the intermediary user account 500 is authorized (step 434), and if so delivers the requested content to the user device 110 by way of the user application 240 (step 436), subject to the user device 110 being at the venue 300 and other business rules as provided herein. In addition, in one embodiment the content is streamed to the user device 110. Streaming in this regard may be construed as the content being downloaded to the user device 110 in encrypted packets or portions and then played back using a decryption key. Other methods of streaming and/or content delivery may also be used according to the present invention.

It should be understood by one skilled in the art that while the exemplary description and embodiments describe BLE enabled devices and BLE beacons to help determine if a user device is considered "at" a particular venue, other methods of determining relative location of a user device to a venue may also be used. For example, the present invention may use WiFi networks at a venue and application program interfaces (API) to determine if a user device is "at" a venue. In one example, the user device has a WiFi radio that communicates with one or more WiFi access points at a venue, and through the venue's network database all user devices that communicate with the access point(s) are captured and stored by the server and related components. The venue application installed and open on the user device is configured to send the user device identification, such as the device WiFi media access control (MAC) address, and venue application identification to the server. The server compares this information with information queried from a RESTful API for information collected by wireless access points (WAP) at a venue. This information is collected by the WAP on a time frequency, such as every 45 seconds, and preferably includes without limitation MAC addresses or other device or user device information for every device transmitting a signal within range of the WAP. As such, if the information matches, the user device identification is added to a database of approved user device identifications similar to as described in FIG. 5. Downstream steps according to this WiFi exemplary embodiment follow a similar path as described in FIGS. 5-8 as would be understood by one of ordinary skill in the art.

According to one embodiment, the methods and descriptions set forth herein will repeat for future interactions between a user device 110 and a venue 300. Accordingly, if a user device 110 returns to the same venue location or a different venue location (for example, a different restaurant of the same restaurant chain), the user device will be authenticated to the same account from the content provider that was set up on the initial content provider content request. As such, the system 100 of the present invention provides a trackable relationship between a user device and content provider. In particular, by creating a unique user credential and account, the content provider may be able to track users and user behavior, including how many times a user device utilizing the content provider content. In addition, the content provider may set and enforce usage limits (including without limitation time based limits, data based limits, and feature based limits) based on user behavior, including without limitation frequency and amount of use.

Figure 9:
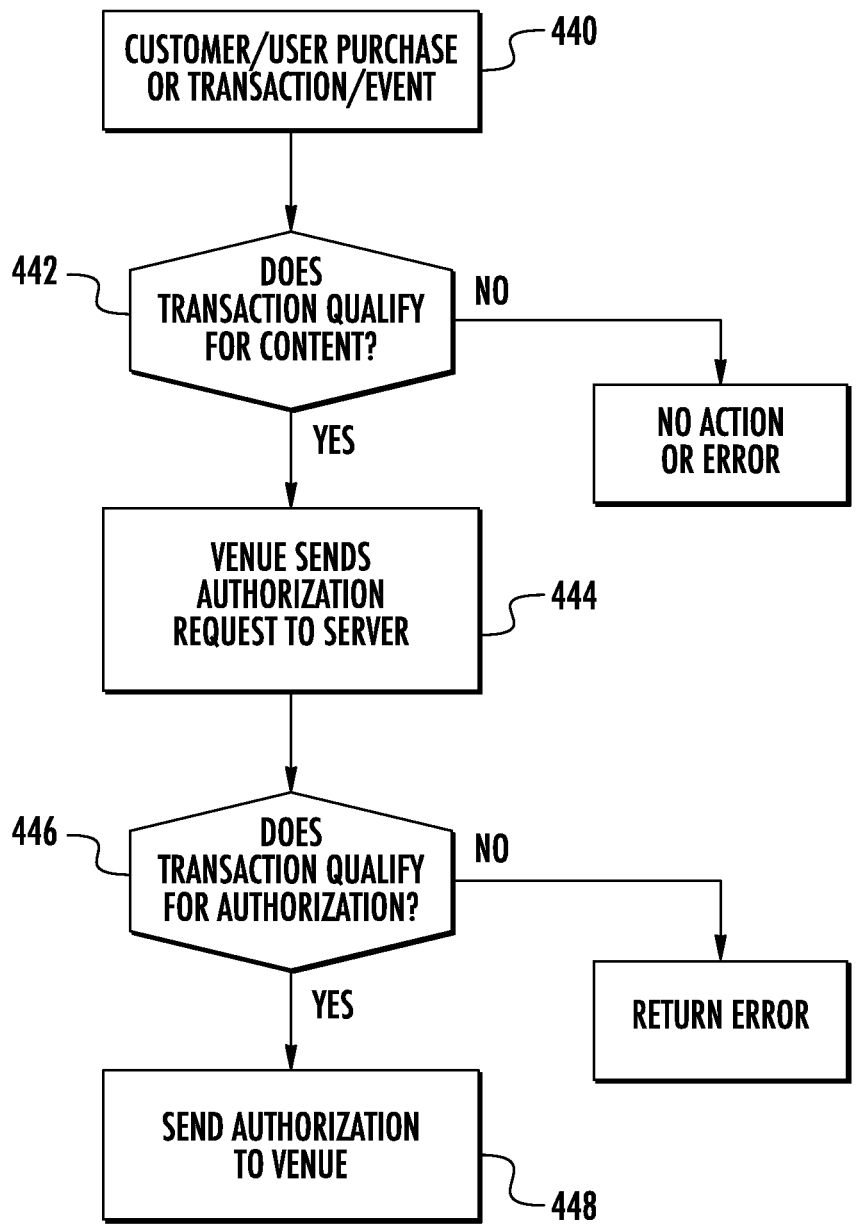
FIGS. 9-11 are flowcharts illustrating an exemplary content authorization process according to one embodiment of the present invention.
Figure 10:
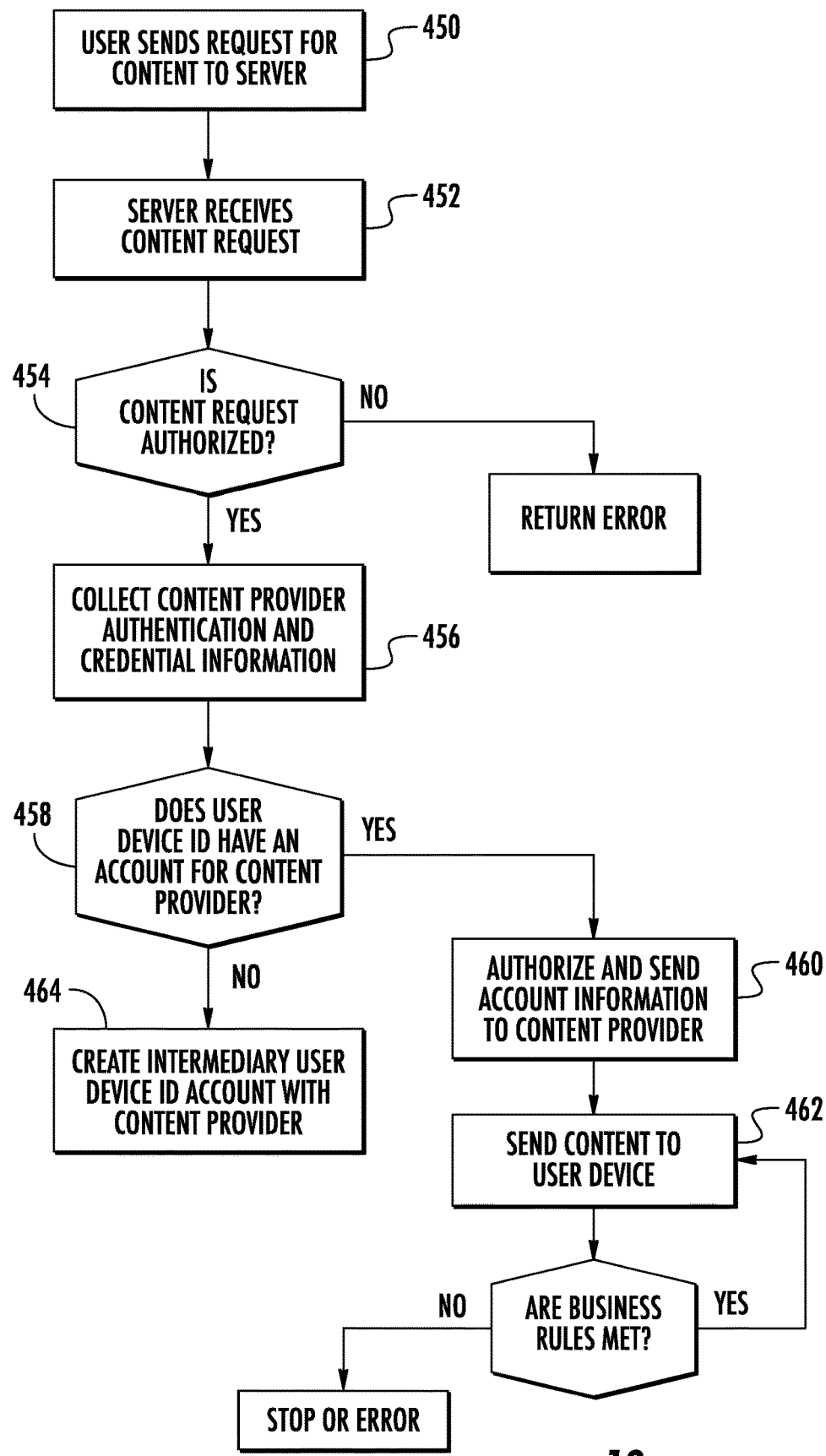
Figure 11:
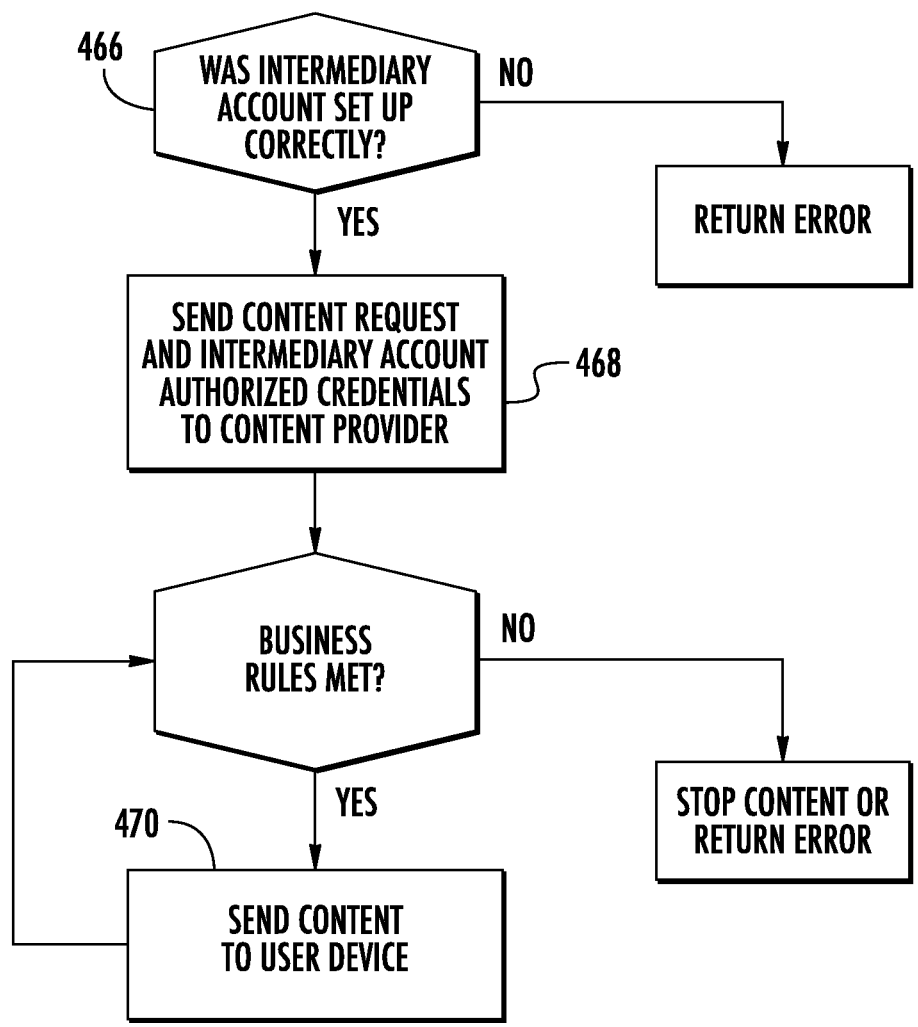

FIGS. 9-11 illustrates an alternative embodiment of the present invention. According to this embodiment, a method of delivering content to a user device is presented whereby a user, such as a customer, becomes qualified or authorized to receive content from a content provider (step 440). The user may become qualified or authorized in any number of ways, including without limitation through a transaction, such as purchasing a particular good or service, attending an event, liking a social media page, or some other action or condition being met. According to one exemplary embodiment, the user is involved in a transaction, such as purchasing an item from a venue 300 via a point of sale, online, or other method. Software running in conjunction with the venue's 300 sales system determines if the transaction qualifies to receive content from a content provider 125, which may be offered as part of a marketing, promotion, or other engagement for the benefit of the user, venue 300, content provider 125, and/or any other party. If the transaction does qualify, the sales system of the venue 300, such as a point of sale API, sends an authorization request to the server 130 (step 444). The server 130 receives the authorization request and determines if the transaction is authorized (step 446). For example, the server 130 may compare the data associated with the request, such as information about the venue 300 and transaction with a database of approved venues and transaction rules and/or requirements, which may be stored in the storage device 140. If the transaction is authorized, certain information is sent via the communications network 120 to the user (step 448). The information can be sent any number of ways, including without limitation sending a QR code, other code, or unique URL to the venue 300 point of sale to be included on a receipt, and sending a code or unique URL to a user via email or text message.

Turning to FIG. 10, the user sends a request for content from the content provider (step 450). This may be performed by the user scanning the QR code associated with the authorized transaction, or by clicking the unique URL, entering a code into the user device 110, or other method to request the content, which may be, for example, access to a streaming entertainment service as described herein, and may also be subject to predetermined business rules, such as access to the content for a period time, for example 2 hours or some other time period. Other information is also sent to the server 130, including the user device identification 300.

The request for content is received by the server 130 (step 452), which determines if the request is authorized (step 454). This determination could be made by comparing the information relating to the user device, code, and/or business rules to a database to confirm the content may be delivered. If so, and similar to the steps described in FIGS. 7-8, the server 130 then collects a content provider's account setup and authentication procedures for that particular content provider 125 and venue 300 (step 456). In one embodiment, the account setup and authentication procedure for a content provider 125 is an email address and password. Any other type of account setup and authentication procedure could be used in the alternative.

Once the content provider's account setup and authentication procedures are known, the server 130 determines if the user device identification 330 has an existing account with the content provider 125 (step 458). This determination could occur, for example, by comparing a user device identification to a database of user device identifications and associated accounts for a match. If the user device identification 330 already has an account with the content provider 125, the server 130 authorizes the user account and authorizes the content provider 125 to provide content (step 460) while certain business rules and conditions are met (step 462), for example without limitation the time period for receiving the content has not expired.

In the case where the user device identification 330 does not have an account with the content provider 125, the system 100 may create an intermediary user account 500 (step 464) or other authorization credentials for the user in order to access the content of the content provider 125. The intermediary user account 500 may be specific to the content provider 125, and may include information such as resource server address, request token, refresh token, resource decryption key, and others that are known in the art. The intermediary user account 500 may also be in the form of an email address and password that is associated with the user device identification 330, and that may be created by the system 110 and stored in the server 130 or component thereof. Information about the intermediary user account 500 can also be stored by the server 130 and monitored for future content provider content requests and other information about account usage. According to one embodiment, information about the user device 110 and/or user device identification 330 are hidden, such as hashed, modified, or the like, to the content provider 125 and/or to the server 130. Other steps may be taken in or around the time of this account setup and authorization, such as if there are restrictions with the intermediary user account 350, if payment is required for authorization, and/or other steps that impact how the user ultimately accesses the content provider's content. Further steps may be taken, including without limitation alerting the user (via the user device 110) that they may have issues or items to resolve before further access is permitted.

FIG. 11 continues the method according to one embodiment of the present invention wherein the system 100 determines if the intermediary user account 500 was created correctly and authorized by the content provider (step 466), such as by comparing the account information to the content provider's rules and requirements, and/or performing an authorization step with the content provider 125. If the intermediary user account 500 is created correctly and authorized, the server 130 sends the authorized intermediary user account 500 information and the content request to the content provider 125 (step 468), and the content is sent from the content provider to the user device 110 (step 470) subject to business rules and conditions be met.

The present invention also contemplates using WiFi during the initial authorization steps. According to one embodiment, the server of the present invention queries a RESTful API for information collected by wireless access points (WAP) at a venue. This information is collected by the WAP on a time frequency, such as every 45 seconds, and preferably includes without limitation media access control (MAC) addresses or other device or user device identification for every device transmitting a signal including the MAC address within range of the WAP. The information collected by the server from the RESTful API may be stored in a memory of the server, such as in a database associated with the venue. When a user opens a mobile application associated with the venue, the mobile application sends information about the user device, e.g., the MAC address, to the server along with information about the mobile application as it relates to the venue.

The information received from the mobile application, including without limitation the MAC address of the user device, is compared by the server in operation with programming code to the information from the RESTful API. If the MAC address of a user device is present in both the mobile application information and the RESTful API information, this indicates that the user device is in proximity of the venue. Accordingly, the MAC address is added to a list of authorized MAC addresses for that specific venue on a temporary basis as described herein. Future authorization steps to deliver service provider content to the user device follow similar steps as described using BLE beacons, sensors or the like, except the MAC address of the device is used as the user ID instead of the BLE information. Other types of device identifiers may also be used in this process according to the present invention, such as a Universal Unique Identifier.

The above-described methods and systems of the present invention can be implemented in computer software, hardware, or other electronic circuitry. The present invention may also be configured as part of a computer program product, including without limitation a non-transitory computer readable storage medium or device, which may execute and/or control the operation of a data processing apparatus. The configuration may, for example, be a programmable processor(s), a computer, and/or multiple computers.

A computer program according to the present invention may be written in any form of computer language and deployed in any form, including without limitation a main program, subroutine, or element that comprises part of a larger computing environment. A computer program can be deployed to be executed on one or a plurality of computers.

Processors suitable for the execution of a computer program are known in the art and include both general and special purpose microprocessors. By way of example, a processor receives instructions and data from a read-only memory or a random access memory or both. The processor forms an essential element of a computer by executing instructions and operable engaging with one or more memory devices for storing instructions and data. Processors perform the methods of the present invention by operating on input data and generating output. Methods can also be performed by special purpose circuitry, including without limitation a field programmable gate array or an application-specific integrated circuit. Modules, subroutines, and software agents can refer to portions of the computer program, processor, special circuitry, software, and/or hardware the implements that functionality.

Data transmission and instructions may occur over a communications network, including the internet, World Wide Web, and other information carriers. Such information carriers suitable for computer instructions and data include non-volatile memory, including without limitation semiconductor memory devices. EPROM, EEPROM, flash memory devices, magnetic disks, internal and removable disks, CD-ROM and/or DVD-ROM disks are examples of information carriers.

The user device contemplated by the methods and systems of at least one embodiment of the present invention includes a display device, such as a liquid crystal display monitor. The interaction with a user can, for example, be a display of information to the user and a touch screen or other input device by which the user can provide input to the computer via the user interface. Feedback can be delivered to the user in any form of sensory feedback (visual, auditory, or tactile), and input from the user may be received in any form, including without limitation acoustic, speech, tactile, or visual input. Other types of user devices contemplated by the present invention include without limitation a computer, a computer with a browser device, a telephone, a cellular phone, a personal digital assistant, a laptop computer, a desktop computer, and/or other communication devices. The browser device includes a world wide web browser, for example, Microsoft® Internet Explorer®, Mozilla® Firefox, and Google® Chrome®.

The systems and methods of the present invention can be implemented in a distributed computing system that includes a back-end component. The back-end component can be, including without limitation a data server, a middleware component, and an application server. The components of the present invention can be operable interconnected by any form or medium of digital data communication, including without limitation a local area network, wide area network, the Internet, wired networks, and/or wireless networks.

The systems and methods of the present invention may include one or more clients and servers. The clients and servers may interact through a communications network and operably communicate by virtue of computer programs running on the respective computers and systems of each client or server.

The communications networks may include packet-based networks, including without limitation the Internet, a carrier internet protocol network, and other packet-based networks. The communications networks may include without limitation a wireless network (wifi network, radio access network, Bluetooth, code-division multiple access network, time-division multiple access network, global system for mobile communications, and/or other circuit-based networks.

As used in the present application, the terms "system," "component," and the like are intended to refer to a computer-related device or entity, either hardware, software, or software in execution. A component may be, including without limitation a process running on a processor, an integrated circuit, and object, and executable, a thread of execution, a program, and/or a computer. Similarly, an application running on a computing device and the computing device can each be a component. One or more components can reside within a process and/or thread on execution and a component can be localized on one computer and/or distributed between two or more computers. Components can execute from various computer readable media having various data structures stored thereon. Components can communicate by way of local and/or remote processes such as in accordance with a signal having one or more data packets.

The processes, steps, and functions described herein can be implemented in hardware, software, firmware, or any combination thereof. If implemented in software, the functions can be stored on or transmitted over as one or more instructions or code on a computer-readable medium that is non-transitory in nature and includes both computer storage media and communication media including any medium that facilitates transfer of a computer program from one place to another. A storage media can be any available media that can be accessed by a computer. In addition, any physical connection is considered part of a computer-readable medium. For example, if the software is transmitted from a website, server, or other remote source using a coaxial cable, fiber optic cable, digital subscriber line, or wireless technologies such as infrared, radio, and microwave are including in the definition of medium.

Furthermore, the word "exemplary" is used to mean serving as an example, instance, or illustration. Any embodiment or design described herein as exemplary is not necessarily to be construed as preferred or advantageous over other embodiments or designs. Rather, use of the word exemplary is intended to present one or more concepts in a more concrete manner.

One skilled in the art will realize the present invention may be embodied in other specific forms without departing from the spirit or essential characteristics thereof. The foregoing embodiments are therefore to be considered in all respects illustrative rather than limiting of the invention described herein. Scope of the invention is thus indicate by the appended claims, rather than by the foregoing description, and all changes that come within the meaning and range equivalency of the claims are thereof intended to e embraced therein.

What is claimed is:

1. A method for providing content on a user device, the method comprising:

receiving a user device identification from a user device by at least one server having one or more processors via a computer network;

adding the user device identification to a database of authorized user device identifications by the at least one server;

sending authorization to the user device to indicate to the user that the user device is authorized to receive the content;

creating, by the at least one server, an intermediary user account relating to the user device identification;

sending the intermediary user account from the at least one server via the computer network to a content provider for authorization to receive content from the content provider specific to the intermediary user account;

receiving authorization of the intermediary user account from the content provider by the at least one server allowing access to the content of the content provider; and providing temporary access to the content of the content provider to the user device when a user of the user device engages a prompt to receive the content, wherein when the user engages the prompt to receive the content, the server first confirms that the user device identification is authorized by comparing the user device identification with the database of authorized User device identifications, and then collects account setup and authentication procedures from the content provider, before the intermediary user account is created.

2. A method according to claim 1, further comprising:

receiving, by the at least one server, a mobile application identifier and at least one venue identification source associated with a venue;

comparing, by the at least one server, the mobile application identifier and the at least one venue identification source to a list of known venue identification sources and mobile application identifiers; and in response to the received mobile application identifier and at least one venue identification source matching a corresponding venue identification source and mobile application identifier from said list of known venue identification sources and mobile application identifiers, adding the user device identification to a list of authorized user device identifications for the venue associated with the at least one venue identification source.

3. A method according to claim 1, wherein the user device identification is authorized to receive content from the content provider when the user device identification is received by the at least one server.

4. A method according to claim 1, wherein the creating step includes creating a unique email address and password as the intermediary user account relating to the user device identification.

5. A method according to claim 1, further comprising receiving a request via the computer network to receive the content of the content provider from the user device by the at least one server.

6. A method according to claim 1, wherein the user device is a mobile device and the content of the content provider is provided to the user device via a mobile application.

7. A method according to claim 1, wherein the content of the content provider is provided to the user device via a website.

8. A method according to claim 2, wherein the at least one venue identification source is associated with a fixed location venue.

9. A method according to claim 2, wherein the at least one venue identification source is associated with a venue capable of movement.

10. A method for providing content on a user device, the method comprising:
receiving from the user device, by at least one server having one or more processors via a computer network, a user device identification, a mobile application identifier and at least one venue identification source associated with a venue;
comparing, by the at least one server, the mobile application identifier and the at least one venue identification source to a list of known venue identification sources and mobile application identifiers;
in response to the received mobile application identifier and at least one venue identification source matching a corresponding venue identification source and mobile application identifier from said list of known venue identification sources and mobile application identifiers, authorizing the user device identification and adding the user device identification to a list of authorized user device identifications for the venue associated with the at least one venue identification source;
transmitting, via the computer network, the authorized user device identification to the user device to indicate that the user device is now authorized to receive content;
receiving by the server a request from a user engaging a prompt on the user device to receive content of a content provider, said user device having an authorized user device identification by the at least one server;
creating, by the at least one server, an intermediary user account relating to the authorized user device identification;
sending the intermediary user account from the at least one server via the computer network to a content provider for authorization to receive content from the content provider specific to the intermediary user account;
receiving authorization of the intermediary user account from the content provider by the at least one server allowing access to the content of the content provider; and
providing temporary access to the content of the content provider to the user device, wherein when the user engages the prompt to receive the content, the server first confirms that the user device identification is authorized by comparing the user device identification with the database of authorized user device identifications, and then collects account setup and authentication procedures from the content provider, before the intermediary user account is created.

11. The method according to claim 10, wherein the at least one venue identification source received by the at least one server is a BLE beacon identification.

12. The method according to claim 10, wherein authorizing the user device identification is temporary while the mobile application identifier and the at least one venue identification source received by the at least one server match the corresponding venue identification source and mobile application identifier from said list of known venue identification sources and mobile application identifiers.

13. The method according to claim 10, wherein the intermediary user account creating step does not occur until said request to receive content is received by the server.

14. A method for providing content on a first user device, the method comprising:
receiving by at least one server having one or more processors via a computer network a hashed user device identification and request to receive content of a content provider from the first user device;
adding the first user device identification to a database of authorized user device identifications by the at least one server;
sending authorization to the first user device to indicate to the user that the first user device is authorized to receive the content;
creating, by the at least one server, an intermediary user account relating to the hashed user device identification;
sending the intermediary user account from the at least one server via the computer network to a content provider for authorization to receive content from the content provider specific to the intermediary user account;
receiving authorization of the intermediary user account from the content provider by the at least one server allowing access to the content of the content provider; and
providing temporary access to the content of the content provider to the first user device when a user of the first user device engages a prompt to receive the content, wherein when the user engages the prompt to receive the content, the server first confirms that the first user device identification is authorized by comparing the user device identification with the database of authorized user device identifications, and then collects account setup and authentication procedures from the content provider, before the intermediary user account is created.

15. A method according to claim 14, wherein the request to receive content of a content provider is received via the computer network from data from one of a QR code, website link, and unique access code.

16. A method according to claim 14, wherein the intermediary user account is created such that the hashed user device identification is hidden from the content provider such that information about the first user device is not shared with the content provider.

17. A method according to claim 14, wherein the temporary access provided is accessible for a predetermined period.

18. A method according to claim 14, wherein the request to receive content of a content provider is received via the computer network from data from one of a QR code, website link, and unique access code relating to at least one of a financial transaction, promotion initiative, and marketing initiative.

19. A system for accessing content on a user device, the system comprising:
a server having one or more processors coupled to memory, the server configured to:
receive a user device identification and request to receive content of a content provider from a user device via a computer network;
add the user device identification to a database of authorized user device identifications by the server;
send authorization to the user device to indicate to the user that the user device is authorized to receive the content;
create an intermediary user account relating to the user device identification and the content provider, wherein information about the user device is hidden from the content provider;
receive authorization of the intermediary user account from the content provider allowing access to the content of the content provider; and
provide via the computer network temporary access to the content of the content provider on the user device when a user of the user device engages a prompt to receive the content, wherein when the user engages the prompt to receive the content, the server first confirms that the user device identification is authorized by comparing the user device identification with the database of authorized user device identifications, and then collects account setup and authentication procedures from the content provider, before the intermediary user account is created.

20. A system according to claim 19, wherein the server is further configured to:
receive a mobile application identifier and at least one venue identification source, the venue identification source being in discoverable proximity to the user device;
compare the mobile application identifier and the at least one venue identification source to a list of known venue identification sources and mobile application identifiers; and
in response to the received mobile application identifier and at least one venue identification source matching a corresponding venue identification source and mobile application identifier from said list of known venue identification sources and mobile application identifiers, add the user device identification to a list of authorized user device identifications for the venue associated with the at least one venue identification source and wherein the user device identification is hashed.

21. A system according to claim 19, wherein the user device is a mobile device and the content of the content provider is provided to the user device via a mobile application.

22. A system according to claim 19, wherein the user device is a mobile device and the content of the content provider is provided to the user device via a website.

23. A system according to claim 20, wherein the at least one venue identification source is associated with a fixed location venue.

24. A system according to claim 20, wherein the at least one venue identification source is associated with a venue capable of movement.

25. A system according to claim 19, wherein the server is configured to provide temporary access to the content of the content provider on the user device for a predetermined time.

26. A system according to claim 20, wherein the server is configured to provide temporary access to the content of the content provider while the venue identification source remains in discoverable proximity to the user device.

27. A system according to claim 19, wherein the intermediary user account is created such that the user device identification is hidden from the content provider such that information about the user device is not shared with the content provider.

28. A non-transitory computer-readable storage medium, the non-transitory computer-readable storage medium comprising processor executable instructions that when executed by at least one processor of a server, causing the server to perform operations comprising:
receiving from a first user device via a computer network a hashed user device identification and request to receive content of a content provider;
adding the first user device identification to a database of authorized user device identifications by the at least one server;
sending authorization to the first user device to indicate to the user that the first user device is authorized to receive the content;
creating an intermediary user account relating to the hashed user device identification;
sending the intermediary user account via the computer network to a content provider for authorization to receive content from the content provider specific to the intermediary user account;
receiving authorization of the intermediary user account from the content provider allowing access to the content of the content provider; and
providing temporary access to the content of the content provider to the first user device, wherein when the user engages the prompt to receive the content, the server first confirms that the first user device identification is authorized by comparing the user device identification with the database of authorized user device identifications, and then collects account setup and authentication procedures from the content provider, before the intermediary user account is created.

29. A non-transitory computer readable storage medium of claim 28, wherein the request to receive content of a content provider is received via the computer network from data from one of a CSR code, website link, and unique access code.

30. A non-transitory computer-readable storage medium of claim 28, wherein the server operations further comprise:
receiving a mobile application identifier and at least one venue identification source associated with a venue;
comparing the mobile application identifier and the at least one venue identification source to a list of known venue identification sources and mobile application identifiers; and
in response to the received mobile application identifier and at least one venue identification source matching a corresponding venue identification source and mobile application identifier from said list of known venue identification sources and mobile application identifiers, adding the user device identification to a list of authorized user device identifications for the venue associated with the at least one venue identification source.

* * * * *